(12) United States Patent
Dohare et al.

(10) Patent No.: US 11,968,212 B2
(45) Date of Patent: *Apr. 23, 2024

(54) SYSTEMS AND METHODS FOR MEMORY TRACING IN ASSET MANAGING SYSTEMS

(71) Applicant: Oracle International Corporation, Redwood Shores, CA (US)

(72) Inventors: Pratibha Anjali Dohare, Seattle, WA (US); Jaime Ismael Rangel Martinez, Seattle, WA (US); Kessle Martin Hodgson, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,697

(22) Filed: Oct. 5, 2022

(65) Prior Publication Data

US 2023/0033002 A1 Feb. 2, 2023

Related U.S. Application Data

(63) Continuation of application No. 17/191,998, filed on Mar. 4, 2021, now Pat. No. 11,496,482.

(51) Int. Cl.
*G06F 21/60* (2013.01)
*G06F 21/78* (2013.01)
(Continued)

(52) U.S. Cl.
CPC ........ *H04L 63/102* (2013.01); *H04L 63/0876* (2013.01); *H04L 63/105* (2013.01); *H04L 67/1089* (2013.01)

(58) Field of Classification Search
None
See application file for complete search history.

(56) References Cited

U.S. PATENT DOCUMENTS

| 11,284,242 B2* | 3/2022 | Chu ...................... H04W 12/64 |
| 2003/0145041 A1* | 7/2003 | Dunham ............. H04L 67/1097 |
| | | 707/999.01 |

(Continued)

OTHER PUBLICATIONS

U.S. Appl. No. 17/191,998, "Notice of Allowance", dated Jul. 15, 2022, 11 pages.

(Continued)

*Primary Examiner* — Venkat Perungavoor
(74) *Attorney, Agent, or Firm* — Invoke

(57) ABSTRACT

The present embodiments relate to implementing change data on no-master NoSQL data stores. An optimized node can be identified from a plurality of NoSQL data storage nodes and a specialized node can be connected (e.g., collocated) to the optimized node. The specialized node can maintain change data capture (CDC) data provided by client nodes in a hash map that can be used as a point of truth for coordinating CDC data across the plurality of NoSQL data storage nodes. The plurality of NoSQL data storage nodes can identify and coordinate all read/write data obtained from multiple client devices in a geographically separated large-scale (e.g., planet scale) system to identify change data in a distributed data store. The specialized data can provide read data to devices in the large-scale system to reconcile inconsistencies in change data across nodes in the large-scale system.

20 Claims, 9 Drawing Sheets

(51) Int. Cl.
*H04L 9/40* (2022.01)
*H04L 67/1087* (2022.01)
*G06F 21/80* (2013.01)

(56) References Cited

U.S. PATENT DOCUMENTS

| | | | |
|---|---|---|---|
| 2010/0030982 A1* | 2/2010 | Sela | G06F 21/60 |
| | | | 726/21 |
| 2015/0212751 A1* | 7/2015 | Shi | G06F 3/0679 |
| | | | 711/103 |
| 2016/0044039 A1* | 2/2016 | Montanari | G06F 21/6218 |
| | | | 726/27 |
| 2017/0060668 A1* | 3/2017 | Farhan | G06F 12/0871 |
| 2017/0068812 A1* | 3/2017 | Zhai | G06F 21/44 |
| 2021/0067699 A1* | 3/2021 | Huang | H04N 1/2112 |
| 2021/0409413 A1* | 12/2021 | Mariappan | G06K 19/06037 |

OTHER PUBLICATIONS

Lee et al., "Heterogeneous Cloud Storage System for Privacy", 2014 Sixth International Conference on Ubiquitous and Future Networks (ICUFN), IEEE, Jul. 2014, pp. 193-198.

Zhang et al., "Towards Privacy Preserving Publishing of Set-Valued Data on Hybrid Cloud", IEEE Transactions on Cloud Computing, vol. 6, No. 2, Apr.-Jun. 2018, pp. 316-329.

Heterogeneous Cloud Storage System for Privacy. Lee. IEEE. (Year: 2014).

Towards Privacy Preserving Publishing of Set-Valued Data on Hybrid Cloud. Zhnag. IEEE. (Year: 2018).

* cited by examiner

| Component | Removable | Volatility | Backup Power | Capacity | Physical Location | User Data | Contents | Privacy Level |
|---|---|---|---|---|---|---|---|---|
| EEPROM | No | Non-Volatile | Coin Battery on the CPU Board | 2 KB | CPU Board U235 | No | PC Board MAC Address | Public |
| Microcontroller | No | Volatile | N/A | 134 KB | CPU Board U243 | No | Security Processing for device firmware | Secret |
| FPGA | No | Non-Volatile | N/A | 2 MB | FPGA Board U54 | No | Switch Power Management logic | Public |
| SPI Flash | No | Non-Volatile | N/A | 2 GB | CPU Board U163 | Yes | Logs and User mirrored traffic | Top Secret |
| eMMC | No | Non-Volatile | N/A | 2 GB | FPGA Board J266 | No | FPGA external memory | Secret |
| SPI Flash | No | Non-Volatile | N/A | 64 KB | CPU Board U215 | No | Fan manufacturer data | Public |
| SPI NOR Flash | Yes | Non-Volatile | N/A | 2 GB | CPU Board U232 | Yes | User configurations and device firmware | Secret |
| SSD | Yes | Non-Volatile | N/A | 128 GB | CPU Board U183 | Yes | User logs, configuration backups, operating system backups, debug scripts | Top Secret |
| SPI Flash | No | Non-Volatile | N/A | 128 KB | CPU Board u32 | No | BIOS flash Memory | Public |
| EEPROM | No | Non-Volatile | FPGA Board Coin Battery U34 | 2 KB | CPU Board U235 | No | Switch Power Management Settings | Public |
| DRAM-DDR3 | No | Volatile | N/A | 2 GB | CPU Board U15 | No | CPU Memory | Secret |

*FIG. 2*

SYSTEMS AND METHODS FOR MEMORY TRACING IN ASSET MANAGING SYSTEMS

CROSS REFERENCES TO RELATED APPLICATIONS

The present application is a continuation of U.S. application Ser. No. 17/191,998, filed Mar. 4, 2021, entitled "METHODS AND SYSTEMS FOR MEMORY TRACING IN ASSET MANAGING SYSTEMS", the entire contents of which is incorporated by reference as if fully set forth herein, under 35 U.S.C. § 120.

BACKGROUND

Modern hardware components include or are connected to a variety of memory-based components that store information usable during operating of the hardware components. For example, a motherboard of a network switch may include dynamic random access memory (DRAM), which stores network workloads and data packets. The motherboard may also include other types of memory such as an electronically erasable programmable read-only memory (EEPROM), which may store firmware for the motherboard, field programmable gate arrays (FPGAs), which may store power management logic, and the like.

Some of the memory-based components may be known to store sensitive user information, critical configuration settings, and secrets that allow remote management of device or systems (e.g., passwords, authentication keys, etc.). In one example, a flash memory may store user applications and metadata related to the operation of the user applications. These components, though not directly storing user information, may store information that could be used to compromise the security of computing system and thereby fraudulently access the user information. In another example, a CPU of the network switch may store Internet Protocol (IP) frames transmitted over the wire to non-volatile memory for further analysis and/or debugging (e.g., referred to as packet mirroring).

BRIEF SUMMARY

Aspects of the present disclosure include a method for tracing memory components in asset management systems. The method comprises: receiving, by an computing device, an indication that a new device has been connected to a network; transmitting, to the new device, a memory identification command; receiving, from the new device, a first set of memory specifications, each memory specification of the first set of memory specifications identifying a component of the new device configured to store data; receiving, from a remote computing device, a second set of memory specifications, each memory specification of the second set of memory specifications identifying a component of the new device configured to store data; generating, based on a comparison of the first set of memory specifications to the second set of memory specifications, a memory-asset data structure that stores a third set of memory specifications, each memory specification of the third set of memory specifications being a memory specification that is in both the first set of memory specifications and the second set of memory specifications; assigning, to each of one or more memory specifications of the third set of memory specifications, a data privacy level that is based on a sensitivity of data stored in the component of the new device identified by the memory specification; and transmitting the memory-asset data structure.

Another aspect of the present disclosure comprises a system comprising one or more processors and a non-transitory computer-readable media that includes instructions that when executed by the one or more processors, cause the one or more processors to perform the methods described above Another aspect of the present disclosure comprises a non-transitory computer-readable media that includes instructions that when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 is an example of fields of a memory specification according to certain embodiments of the present disclosure.

DETAILED DESCRIPTION

Figure 1:
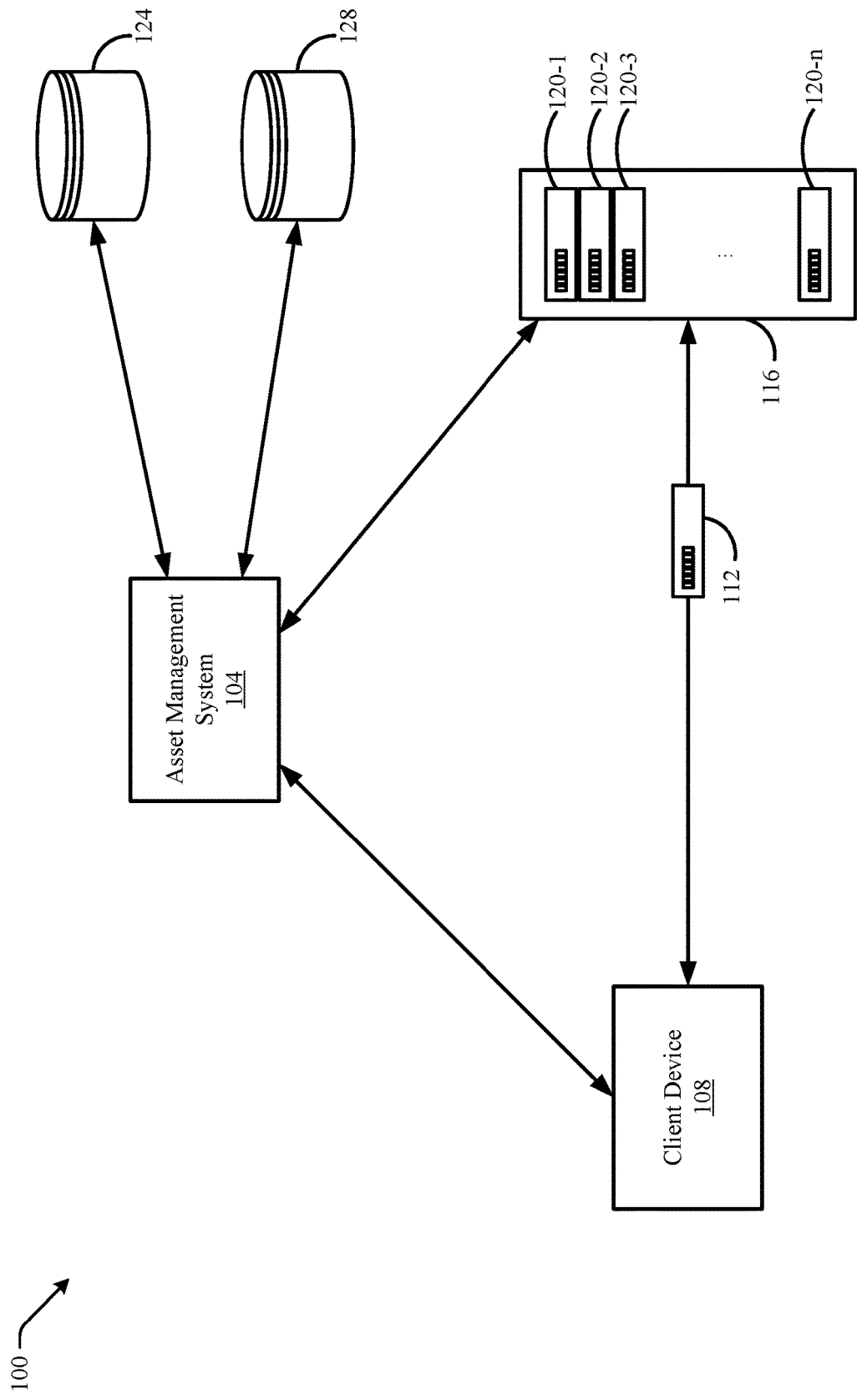
FIG. 1 is an example block diagram of tracing memory by an asset management system to certain aspects of the present disclosure.

The methods and systems described herein involve tracing memory-based components in asset management systems. Asset management systems track hardware devices and software of large networks (e.g., cloud networks, data centers, enterprise systems, etc.). For example, a data center may include servers, network switches, databases, etc., and the various software executing on each device. Each device may include various memory-based components that store different types of data used during operation of the device. For example, a motherboard of a network switch may include a solid state drive (SSD) that stores applications and user data, SPI flash that stores basic input/output system (BIOS) firmware, an SPI flash that stores log data and mirrored traffic data, and other memory-based components. Some memory-based components such as the SSD in the previous example, may store user data. Other memory-based components may not store user data directly, but may be used to indirectly access user data (e.g., mirrored traffic data, etc.) or may be compromised to enable fraudulent access to the user information of the device.

An asset management system may track each memory-based component of devices as the devices are added to a same network, a data center, a asset management system, a cloud network, enterprise, or the like to prevent unauthorized access of memory-based components that may store user data, data usable to access user data, data usable to compromise the device, etc. For example, a client device may obtain an identification of a new device (e.g., a serial number or the like) to be added to the network. The new device may then be connected to the network (e.g., added to a server, connected to a network switch or gateway, etc.). When the new device comes online the asset management system may query the new device for a set of memory specifications. Each memory specification may correspond to a memory-based component configured to store data. Examples of properties included in a memory specification include, but are not limited to, an identification of a memory-based component, an identification of a type of memory, configuration information associated with the memory-based component, identification of content stored by the memory-based component, capacity of the memory-based component, indication as to whether the memory-based component can be removed from the new device, whether the memory-based component stores user data, whether the memory-based component has a battery backup, combinations thereof, or the like.

The asset management system may query a volatility database that stores, for each device, a set of memory specifications generated by an entity associated with the device (e.g., such as a manufacturer of the device, an administrator of the device, an owner of the device, a previous owner of the device, or the like.). The asset management system may compare the set of memory specifications received from the new device to the set of memory specifications received from the volatility database. The asset management system may generate a memory-asset data structure that includes each memory specification that is included in both the set of memory specifications from the new device and the set of memory specifications from the volatility database). The asset management system than receive a memory policy (e.g., from a policy database, or the like). The memory policy may indicate, for each memory specification, a data privacy level that corresponds to the data stored in the memory identified by the memory specification. For example, the data privacy level may include public (e.g., the data is not sensitive and can be accessed by anyone), secret (e.g., the data is sensitive and access should be restricted), top secret (e.g., the data is highly sensitive and access should be restricted to only specifically enumerated users), or the like.

The asset management system may identify discrepancies between the set of memory specifications from the new device and the set of memory specifications from the volatility database. For instance, the set of memory specifications from the new device may include memory specifications or entries therein that are not included in the set of memory specifications from the volatility database (or vice versa). In those instance, the asset management system may transmit a query to a client device for information associated with missing memory specifications (e.g., such as a location in which the missing memory specifications are stored, an identification of an older missing memory specification that may be used, etc.) or the missing entries therein. The client device may provide information to the asset management system that reconciles the differences between the set of memory specifications from the new device and the set of memory specifications from the volatility database such that the memory-asset data structure includes a set of memory specifications that accurately identifies each memory-based component of the new device.

The memory-asset data structure may then be transmitted (e.g., to a local or remote storage device, a database, a server, one or more client devices, etc.) for use in managing sensitive data within a system. Upon detecting a change in the operation status of one or more devices, the asset management system may access the memory-asset data structure to perform one or more actions. For example, if an existing device connected to the asset management system is updated (e.g., hardware update modifying one or more of the memory-based components, software update modifying the functionality of one or more of the memory-based components or the contents of a memory-based component, and/or the like), the asset management system may identify a list of affected devices and update the memory specifications in the memory-asset data structure associated of each device of the list of affected devices. The asset management system may then apply the policy from the policy database to each updated memory specifications (e.g., to ensure that the data privacy level of each memory specifications accurately categorizes the sensitivity of the data being stored by the memory-based component represented by the memory specification).

In another example, the change in operation status of a device may indicate that a device has reached end-of-life. Memory-based components, such as hard-disk drives (HDDs), flash, or SSDs have a failure rate that increases over time (e.g., based on mechanical wear, a limitation on a number of reads/writes, etc.), which can affect an ability of a device to reliably store data, maintain a requisite data redundancy, or satisfy read requests. When the asset management system receives and indication that a device has reached end-of-life (e.g., risk of failure is greater than a threshold, time, number of writes has occurred, number of reads have occurred, user input, device has been replaced with a newer model, etc.), the asset management system may retrieve the memory-asset data structure associated with the device to determine the privacy level of each memory-based component of the device. If a data privacy level of a memory-based component is high, then the asset management system may cause the memory-based component to be erased (e.g., overwrite with zeros, ones, or random data, restored to factory settings, provisioned with predetermined data or code, combinations thereof, or the like). In some instances, if a data privacy level is anything higher than public (e.g., any indicator that the data stored by the memory-based component is sensitive), then the data management system may cause the memory-based component to be erased. Once each memory-based component marked for erasure is erased, the data management system may cause the device to reach end-of-life (e.g., discarded, recycled, disconnected from the system managed by the asset management system, etc.).

Examples of the one or more operations may include, but are not limited to, destroying memory-based components, replacing memory-based components, erasing memory-based components, destroying the device, limiting how the device can be used or repurposed (e.g., the functionality performable by the device, the users the device may interact with, etc.), returning the device and/or memory-based component therein to a manufacturer, transferring the device, remanufacturing the device, or the like. Change in an operational status of a device can include, but are not limited to, change in functionality of a device, change in a use of a device, end-of-life of a device, updating software or hardware of a device, downgrading hardware or software of a device, modifying software or hardware of a device, a change in a user or set of users associated with a device (e.g., users that interact, use, and/or operate the device, etc.), a change in ownership of a device, and/or any change in the data or the use of the data stored in any memory-based component of a device. The asset management system may use the memory-asset data structure to ensure that memory-based components do not leak sensitive user data, leak data usable to access sensitive user data, or leak data usable to compromise the security of systems managed by the asset management system.

FIG. 1 is an example block diagram of tracing memory by an asset management system to certain aspects of the present disclosure. System 100 may be a network, data center, cloud network, or the like that includes one or more devices. Asset management system 104 may operate to track and manage devices (and components therein) within a system. For example, asset management system 104 may identify devices and components therein, determine when new devices are added to system 100, determine when devices are disconnected from system 100, determine when devices are updated or modified, define maintenance schedules for devices, determine when devices reach end-of-life or otherwise should be removed from system 100, etc. In some instances, asset management system 104 may be a computing device connected to the system. Asset management system 104 may include one or more processors coupled to a memory that stores instructions for executing one or more processes of the asset management system. In other instances, asset management system 104 operate as a software process executing on a device (e.g., such as device 120-1, 120-2, 120-3 . . . 120-n or other devices or other devices that may or may not be connected to system 100). In still yet other instances, asset management system 104 may be a distributed process that executes on two or more devices (e.g., such as device 120-1, 120-2, 120-3 . . . 120-n of system 100 or other devices that may or may not be connected to system 100).

Asset management system 104 may be connected to one or more client devices 108 that may operate asset management system 104 such as to add, update, remove, and/or manage devices, components, and/or software connected to the system. For instance, when a new device is added to the system, such as server 112, client device 108 may obtain an identifier of server 112 (e.g., a serial number, or the like) and transmit the identifier to asset management system 104. Asset management system 104 may determine that server 112 is a new device (e.g., compare the identifier to a record of known identifiers) and add the identifier to the list of managed assets. Server 112 may then be connected to the system. For instance, server 112 may be connected to rack 116, which may include one or more power supplies (primary, secondary, redundancies, etc.) and one or more devices 120 (e.g., servers, computing devices, client devices, network switches, or the like). System 100 may include any number of racks, such as rack 116, and/or devices such as devices 120 and/or other devices (e.g., Internet-of-Things (IoT) devices and/or any device configured to be connected to a network or store data). Server 112 once connected to rack 116 may transmit a signal to asset management system 104 that indicates to asset management system 104 that server 112 has been connected to system 100. For example, server 112 may transmit a data packet with a device identifier that matches the identifier transmitted by client device 108. Alternatively, server 112 may simply request access to a same network as system 100 causing asset management system 104 to detect the new device connected to the same network. Asset management system 104 may compare connection information (e.g., Internet Protocol address, Media Access Control address, etc. that corresponds to server 112 to the information provided by client device 108 (e.g., the identifier) to determine if that server 112 is the expected new device.

Asset management system 104 may request, from server 112, information associated with each memory-based component of server 112. A memory-based component may be any component that is configured to store data (e.g., cache, random access memories, read-only memories, persistent memories, etc.). For example, a server may include a motherboard that includes or is connected to a number of different memory-based devices such as, but not limited to, a processor (that includes cache memory used during execution of processes by the processor), random access memory (e.g., volatile memory that operates to store temporary information during operation of server 112, persistent storage (e.g., local or remote HDDs and/or SSDs), one or more flash memories (e.g., storing log data, error reports and/or error correction data, firmware, basic input/output system (BIOS), power control for the motherboard or connected devices such as fans, fan controllers, etc.), and the like. Memory-based devices may store user data that may not be shared with other users/devices. Memory-based devices may also store data that may indirectly include user data such as log data. Log data may include information stored by a device for diagnostic, redundancy, error correction purposes or the like. For example, log data of a network switch may store a data packets, mirrored traffic information, an identification of connected devices, an identification of previously connected devices, etc. that could include sensitive data, data usable to access sensitive data, or data usable to access sensitive devices (e.g., cryptographic keys, IP addresses, etc.). Memory-based devices may also store general data such as BIOS firmware, fan power control, etc. that may be considered public (e.g., a low data privacy level or the like).

Server 112 may store information associated with each memory-based component in memory specifications. A memory specification may include an identification of the memory-based component and information associated with the memory-based component. Examples of information associated with the memory-based component include, but are not limited to, whether the memory-based component is removable from the device, whether the memory-based component includes volatile or non-volatile memory, the capacity of the memory in the memory-based component, the physical location of the memory-based component (e.g., the physical location within the device), whether the memory-based component includes user data, an identification of the contents of the memory of the memory-based component, combinations thereof, or the like. Server 112 may transmit a first set of memory specifications that correspond to the memory-based components of server 112 to asset management system 104.

Asset management system 104 may request a second set of memory specifications from volatility database 124 (e.g., also referred to herein as statement of volatility (SoV)

database 124). SoV database 124 may store a set of memory specifications (e.g., memory specification corresponding to a memory-based component) for each of one or more devices connected to system 100. In some instances, each set of memory specifications may be received from an entity associated with the corresponding device. For example, system 100 may receive a set of memory specifications from a manufacturer of server 112 and store the set of memory specifications in SoV database 124. Examples of entities from which system 100 may receive a set of memory specifications corresponding to a device may include, but are not limited to, a manufacturer of the device, a current owner of the device, a previous owner of the device, a previous asset management system, combinations thereof, or the like.

Asset management system 104 may compare the first set of memory specifications to the second set of memory specifications to identify pairs of matching memory specifications (e.g., a memory specification that is found in both the first set of memory specifications and the second set of memory specifications). Asset management system 104 may define a memory-asset data structure including a third set of memory specifications that includes each memory specification that is found in both the first set of memory specifications and the second set of memory specifications. The memory-asset data structure may include a record of each memory-based component of system 100 (e.g., each represented as memory specification). The record be a table, directed graph, linked list, or any other data structure configured to store or represent memory specifications.

Asset management system 104 may generate flags for additional information based on the comparison between the first set of memory specifications and the second set of memory specifications (e.g., such as if there is no second set of memory specifications in SoV 124 or differences between the first set of memory specifications and the second set of memory specifications. For instances, asset management system 104 may flag each memory specification of the first set of memory specifications that does not have a matching memory specification in the second set of memory specifications (e.g., either the second set of memory specifications lacks a corresponding memory specification or the corresponding memory specification does not include the same information associated with the memory-based component as the memory specification from the first set of memory specifications). Asset management system 104 may also flag each memory specification of the second set of memory specifications that does not have a matching memory specification in the first set of memory specifications.

One or more client devices 108 may resolve each flag generated by the asset management system. In some instances, client device 108 may generate a missing memory specification for the third set of memory specifications. In other instances, client device 108 may resolve a difference between a memory specification in the first set of memory specifications and corresponding memory specification the second set of memory specifications. For example, given a first memory specification (e.g., from the first set of memory specifications) corresponds to an SPI flash memory and a second memory specification (e.g., from the first set of memory specifications) that also corresponds to the SPI flash memory, but includes different information (e.g., additional information in a field, additional fields, less fields, different information in a field, lacks information in a field, etc.), client device 108 may reconcile the differences by generating a third memory specification that includes the correct information from the first memory specification and the second memory specification. The third memory specification may be added to the third set of memory specifications and the flag may be cleared. Alternatively, client device 108 may modify the first memory specification or the second memory specification with the correct information from the first memory specification and the second memory specification, store the modified memory specification the third set of memory specifications, and clear the flag.

The memory-asset data structure may include memory specifications that correspond to multiple domains, systems, geographical locations, devices, etc. organized into a hierarchy. The hierarchy may organize memory specifications that correspond to a same device (e.g., a set of memory specifications), then the sets of memory specifications that are in physical proximity (e.g., those being a same rack, connected to a same power supply, connected to a same network switch or gateway, etc.), then sets of memory specifications that correspond to a same system (e.g., such as a same network, data center, etc.), then sets of memory specifications that correspond to a same domain. For example, as shown in FIG. 1, the hierarchy of the memory-asset data structure may represent the memory specifications of a first domain (of one or more domains), the hierarchy may then represent memory specifications of each system of the first domain (e.g., including system 100), for system 100, the hierarchy may then represent memory specifications correspond of each rack of each system 100 such as rack 116, and for rack 116 the hierarchy may represent the set of memory specifications that correspond to each device 120 connected to rack 116. In other words, a memory-asset data structure may include a hierarchy that represents memory specifications according to domain/system #/rack/device. Other properties may be used to organize memory specifications into hierarchy.

Asset management system 104 may retrieve a policy from policy database 128. Policy database 128 may store policies that are based on the hierarchy of the memory-asset data structure. A policy may indicate how memory-based components are to be managed by asset management system 104 based on one or more fields of a memory specification. In some instances, a policy may use one or more fields of a memory specification to assign a data privacy level to a memory specification. For example, a memory specification indicates that the corresponding memory-based component stores user data may be assigned a top-secret data privacy level indicating that the data is highly sensitive. As a result, asset management system 104 control how the device and/or memory-based component is disposed of when being removed from system 100. Each policy of policy database 128 may assign a data privacy level to a subset of the memory specifications represented by the memory-asset data structure (e.g., based on the hierarchy). For example, a policy may be applied to memory specifications that correspond to devices rack 116. Another policy of policy database 128 may be applied to memory specifications that correspond to devices of system 100. A policy may be applied to each device at a specified level of the hierarchy and below). For example, if a policy is applied to system 100 then it would apply to the set of memory specifications of each device of each rack of system 100.

In some instances, two or more policies may be applied to a same memory specification such that the memory specification may be assigned two or more data privacy level (e.g., one by each policy). If the two or more data privacy levels do not match, then asset management system 104 may assign the data privacy level of the two or more data privacy levels that his higher (e.g., more restrictive). For example, if a first policy assigns a secret data privacy level and a second policy assigns a top secret data privacy level than the top secret data privacy level may be assigned to that memory specification. This may prevent a less restrictive policy from assigning a data privacy level that a more restrictive policy assign to a memory specification.

Examples of data privacy levels for assigned to memory specifications corresponding to memory-based components that store particular content is found in Table 1 below:

| Content Type | Privacy Level |
| --- | --- |
| External User Data | Top Secret |
| User Logs | Top Secret |
| User Keys | Top Secret |
| Data Center Keys | Top Secret |
| User Data Center Configuration | Secret |
| User Credentials | Top Secret |
| Internal User Data | Secret |
| Manufacturer Data | Public |
| User Firmware | Top Secret |
| Vendor Firmware | Public |
| Operating System | Public |
| System Configuration | Public |

Once one or more policies are applied to the memory-asset data structure, the memory-asset data structure may be output. Outputting the memory-asset data structure may include, but is not limited to, transmitting the memory-asset data structure to a computing device, one or more of one or more client devices 108, a database, a server, or the like. In some instances, outputting the memory-asset data structure may include transmitting the memory-asset data structure to local memory (e.g., within a same computing device as asset management system 104) or remote memory.

Asset management system 104 may perform one or more operations that modify SoV's in SoV database 124 and/or polices in policy database 128. For example, SoV's in SoV database 124 may be modified by adding SoV's, updating SoV's, or deleting SoV's. Policies in policy database 128 may be modified by adding policies, updating policies, or removing policies.

A client device may add a new SoV by transmitting an identification of a new device (e.g., identifier for a new SoV) and a set of memory specifications (e.g., content of the new SoV) to asset management system 104. Asset management system 104 may transmit the identification of the SoV and the set of set of memory specifications to SoV database 124 with a command indicating the new SoV is to be added. Asset management system 104 may then receive a communication from SoV database 124 indicating that the identified SoV has been added.

A client device may update an SoV by transmitting an identification of a SoV to be updated and an indication of what is to be updated. Asset management system 104 may then identify a list of devices that may be affected by modifying the SoV and transmit the update to the SoV to SoV database 124. Asset management system 104 may then update a record of each device of the list of devices based on the updates to the SoV. For example, the updates to the SoV may added, remove, and/or modify fields of a memory specification of a devices. Asset management system 104 may identify a list of devices that are affected and a list of the memory specifications of the memory-asset data structure that are associated with those devices that have at least one field that is added, removed, or updated due to the updated SoV. Asset management system 104 may then modify the memory specifications of the list of memory specifications by adding, removing, and/or modifying the fields of those memory specifications according to the updated SoV. Asset management system 104 may request and receive a policy associated with the list of devices from policy 128. Asset management system 104 may then apply the policy to the list of memory specifications to assign a data privacy level to each memory specification of the list of memory specifications.

A client device may delete an SoV by transmitting an identification of a SoV to be deleted to asset management system 104. Asset management system 104 may transmit the identification of the SoV to SoV database 124 with a command indicating the identified SoV is to be deleted. Asset management system 104 may then receive a communication from SoV database 124 indicating that the identified SoV has been deleted.

A client device may add a policy by transmitting an identification of a policy to be added and the contents of the policy (e.g., a set of rules that when applied, assign a data privacy level to a memory specification) to asset management system 104. Asset management system 104 may transmit new policy to policy database 128 with a command indicating the new policy is to be added. Asset management system 104 may receive a communication from policy database 128 indicating that the new policy has been added.

A client device may update a policy by transmitting an identification of a policy to be updated and the contents of the updated policy to asset management system 104. Asset management system 104 may transmit new policy to policy database 128 with a command indicating the new policy is to be updated. Asset management system 104 may receive a communication from policy database 128 indicating that the new policy has been added. Asset management system 104 may update the memory-asset data structure based on the updated policy. Asset management system 104 may apply the updated policy in a background process. In some instances, operations performed on devices through asset management system 104 may be suspended until the updated policy has been applied.

A client device may delete a policy by transmitting an identification of a policy to be deleted to asset management system 104. Asset management system 104 may transmit the identification of the policy to be deleted to policy database 128 with a command indicating the new policy is to be deleted. Asset management system 104 may receive a communication from policy database 128 indicating that the new policy has been deleted. Asset management system 104 may update the memory-asset data structure based on the deleted policy. Asset management system 104 may apply the updated policy in a background process. In some instances, operations performed on devices through asset management system 104 may be suspended until the updated policy has been applied. If deleting the policy causes the data privacy level assigned to one or more memory specifications to be removed (e.g., because the policy no longer applies), a flag may assigned to the one or more memory specifications to request user input for assigning a data privacy level to the each of the flagged one or more memory specifications. Alternatively, if deleting the policy causes the data privacy level assigned to one or more memory specifications to be removed, asset management system 104 may automatically assign a highest data privacy level as a default data privacy level. This default data privacy level may be overridden by user input assigning a data privacy level or from application of another policy.

In some instances, asset management system 104 may receive an indication of a change in the operational status of a device or memory-based component of a device. Asset management system 104 may detect a change in an operational status of a device memory-based component therein based on an indication received from the device, an indication received from a client device, a threshold time interval has expired (e.g., time since the device or memory-based component was added to system 100, etc.), an error log associated with the device, an indication that a functionality of the device has changed, combinations thereof or the like. For example, asset management system 104 may receive an indication that a device has been operational for a time interval that is greater than a threshold (e.g., an end-of-life threshold) that indicates the device or memory-based component therein has reached end-of-life and is to be removed from system 100. In response, asset management system 104 may identify the data privacy level of each memory specification that corresponds to the memory-based components of the device (e.g., if the device has reached end-of-life). Asset management system 104 may then execute one or more operations based on any field of each memory specification. For instance, asset management system 104 may determine one or more operations based on a data privacy level of each memory specification associated with the device, an indication of the volatility of the memory-based component, an indication of whether the memory-based component having a data privacy level greater than or equal to secret can be removed.

For example, if a memory specification corresponding to a memory-based component is assigned a data privacy level that is greater than or equal to secret and the memory-based component is removable, then the memory-based component may be removed and the device may proceed to end-of-life (e.g., recycled, repurposed, upgraded, etc.). The removed memory-based component may be erased and/or destroyed (e.g., depending on the data privacy level, user input, and/or a policy in policy database 128). In another example, if a memory specification corresponding to a memory-based component is assigned a data privacy level that is greater than or equal to secret and the memory-based component is not-removable the memory-based component may be erased and/or destroyed (e.g., depending on the data privacy level, user input, and/or a policy in policy database 128). In some instances, a data privacy level of secret may cause a memory-based component to be erased (e.g., by writing zero bits, one bits, or random bits) to the memory. A data privacy level of top secret may cause a memory-based component to be destroyed.

In some instances, if a memory-based component includes volatile memory (e.g., memory that requires a current to retain data) such as RAM, asset management system 104 may cause the device or memory-based component to be retained in an unpowered state for a predetermined time interval (with backup power removed or disabled) before being transferred due to end-of-life. This may cause the volatile memory-based component to lose any data stored within. Alternatively, or additionally, the device may be erased manually or destroyed (e.g., if associated with a memory specification assigned a secret or top secret data privacy level).

In some examples, asset management system 104 may erase the data of each memory based component having at least a secret data privacy level to prevent data of the device from being leaked during recycling or repurposing of the device. In another example, asset management system 104 may cause a device to be flagged for destruction if at least one memory-based component has a top secret data privacy level.

FIG. 2 is an example of fields of a memory specification according to certain embodiments of the present disclosure. Each memory specification may include one or more fields that include an identification of the associated memory-based component and information associated with the memory-based component. In some instances, each memory specification may correspond to a particular memory-based component (e.g., identified by a serial number, or manufacturing lot identifier, etc.). In those instances, a system may include a memory specification for each memory-based component multiple (nearly) identical instances of the memory-based component exist the system. For example, a first device may include a first SSD and a second device may include an second SSD of a same model and specification as the first SSD. An asset management system may generate a first memory specification associated with the first SSD and a second memory specification associated with the SSD even though the two memory specifications may be (nearly) identical. In other instances, a memory specification may correspond to devices of a same type. In those instances returning to the previous example, a single memory specification may be generated to represent the first SSD and the second SSD. The single memory specification may include additional fields to capture information associated with individual instances of each device (e.g., unique serial numbers, content that may be stored in each device, etc.).

A memory specification may include one or more fields that represent a memory-based component. The example memory specification shown includes a component identifier (e.g., a name, serial number, lot number, etc.), an indication of whether the memory-based component is removable from the device, an indication of whether the memory-based component includes volatile and/or non-volatile memory, an indication of whether the memory-based component includes backup power (e.g., and if so the type of backup power and/or location of the backup power), an indication of a capacity of the memory of the memory-based component, a physical location of the memory-based component relative to the device, an indication of whether the memory-based component stores user data, an indication of the content stored in the memory-based component, and an assigned privacy level of memory specification. Each memory specification may include more or less fields than those shown in FIG. 2.

As previously described, an asset management system may receive a first memory specification for a first memory-based component from the device that includes the memory-based component. The asset management system may receive a second memory specification that corresponds to the memory-based component from a SoV database. The second specification may have been received from a manufacturer of the memory-based device (or from a SoV database, which stores the memory specification once received from the manufacturer). In some instances, the first memory specification and the second memory specification may be identical. In that instance, the asset management system may store a third memory specification (e.g., the first memory specification, the second memory specification, a new memory specification that includes each of the fields of the first memory specification or second memory specification).

In other instances, the first memory specification and the second memory specification may be different. In those instances, the asset management system may reconcile the differences between the first memory specification and the second memory specification. For example, the asset management system may generate a third memory specification that includes each unique field in the first memory specification and the second memory specification with the values of each field empty. The asset management system may then compare the values of each field in one memory specification with the values of the corresponding field in the other memory specification. If the value of a field of the first memory specification matches the value of the corresponding field of the second memory specification, then that value is written to the corresponding field of the third memory specification. If the value of a field of the first memory specification does not match the value of the corresponding field of the second memory specification, then the asset management system may select the value of the field first memory specification or the value of the corresponding field in the second memory specification (e.g., based on user input, a set of rules, etc.). If a field of the first memory specification does not have a matching field in the second memory specification, then the value for that field of the first memory specification is written to the corresponding field of the third memory specification. If a field of the second memory specification does not have a matching field in the first memory specification, then the value for that field of the second memory specification is written to the corresponding field of the third memory specification. The resulting third memory specification, may include the data from both the first memory specification and the second memory specification with any conflicting values or fields reconciled by the asset management system.

Figure 3:
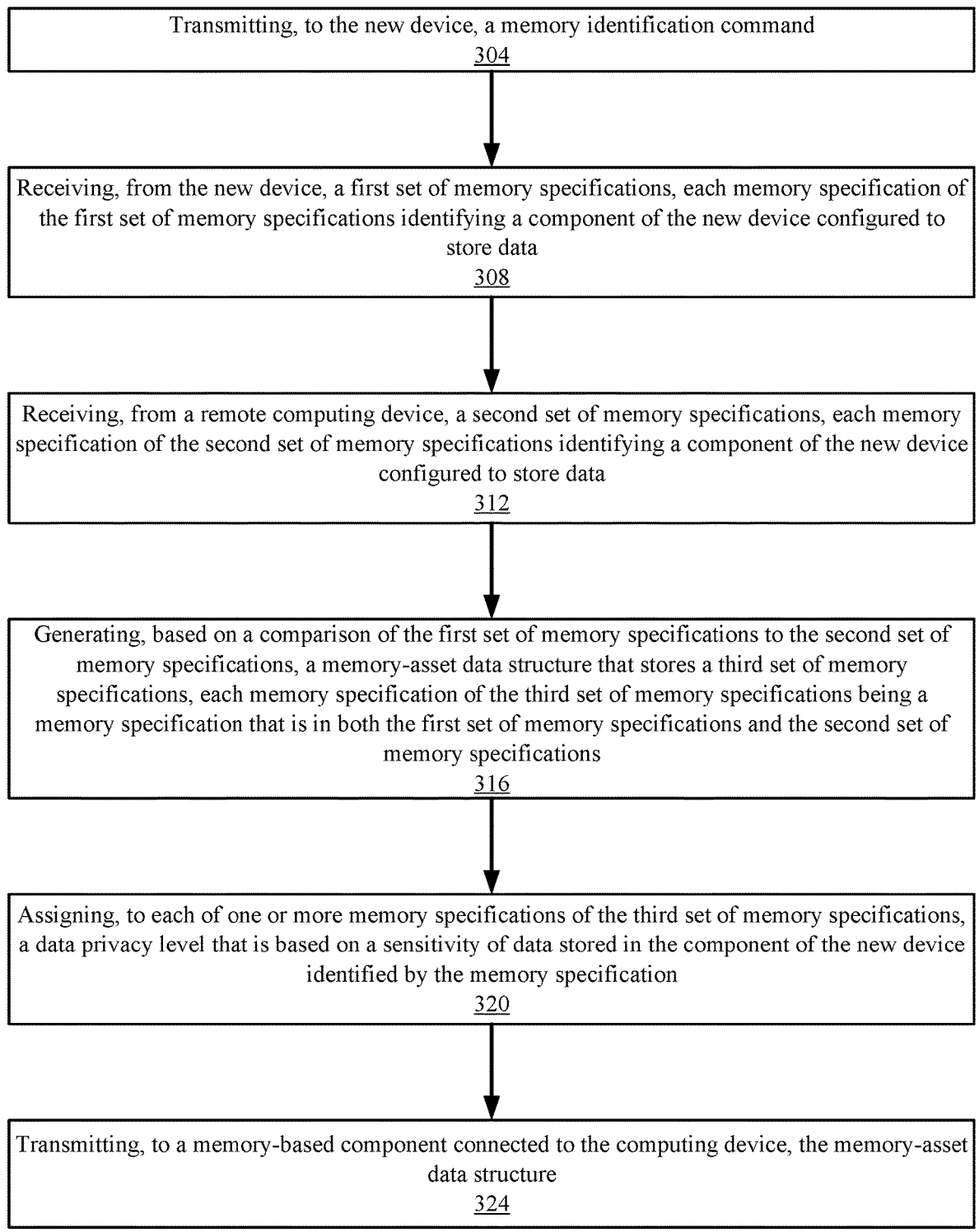
FIG. 3 is an example flowchart of a process for tracing memory by an asset management system according to certain aspects of the present disclosure.

FIG. 3 is an example flowchart of a process for tracing memory by an asset management system according to certain aspects of the present disclosure. At block 304, a computing device (e.g., such as asset management system 104, or the like) transmits a memory identification command to a new device. In some instances, the memory identification command may be transmitted in response to the new device being connected to a same system (e.g., data center, network, cloud network, etc.) as the computing device. In other instances, the memory identification command may be transmitted in response to receiving an identification of the new device (e.g., from a client device, server, etc.).

At block 308, the computing device receives a first set of memory specifications from the new device. Each memory specification of the first set of memory specifications may identify a component (e.g., such as a memory-based component) of the new device that is configured to store data. Each memory specification may include one or more fields that include an identification of the component and information associated with the component. The memory specification may include one or more of the fields as previously described.

At block 312, a second set of memory specifications may be received from a remote device (e.g., a database, a server, client device, etc.). Each memory specification of the second set of memory specifications may identify a component of the new device that is configured to store data.

At block 316, the computing device generates, based on a comparison of the first set of memory specifications to the second set of memory specifications, a memory-asset data structure that stores a third set of memory specifications, each memory specification of the third set of memory specifications being a memory specification that is in both the first set of memory specifications and the second set of memory specifications. In some instances, each memory specification of the first set of memory specifications may match a corresponding memory specification of the second set of memory specifications. In those instances, the third set of memory specifications may be equal to the first set of memory specifications and the second set of memory specifications.

In other instances, some memory specifications of the first set of memory specifications may not match corresponding memory specifications of the second set of memory specifications. In those instances, the computing device may flag each memory specification that that is in the first set of memory specifications and not in the second set of memory specifications and each memory specification of the second set of memory specifications that is not in the first set of memory specifications. The computing device may then reconcile those memory specifications (e.g., determine whether those memory specifications or the fields therein are to be included in the third set of memory specifications as previously described in connection to FIG. 2) and determine which memory specifications are to be added to the third set of memory specifications.

The computing device may then compare each memory specifications of the first set of memory specifications that has a corresponding memory specification in the second memory specification (e.g., as described in connection to FIG. 2). For example, if a memory specification of the first set of memory specifications matches a corresponding memory specification in second set of memory specifications, then that memory specification is stored in the third set of memory specifications. If a memory specification of the first set of memory specifications does not match a corresponding memory specification in second set of memory specifications, then a new memory specification is generated that includes values of fields of the memory specification from the first memory specification and of the memory specification from the second memory specification. (e.g., as determined by the computing device, user input, and/or as previously described). The new memory specification be added to the third set of memory specifications. If a memory specification of the second set of memory specifications does not match a corresponding memory specification in the first set of memory specifications, then a new memory specification is generated that includes values of fields of the memory specification from the first memory specification and of the memory specification from the second memory specification (e.g., as determined by the computing device, user input, and/or as previously described).

At block 320, the computing device may assign, to each of one or more memory specifications of the third set of memory specifications, a data privacy level that is based on a sensitivity of data stored in the component of the new device identified by the memory specification. The computing device may retrieve a policy that can be applied to the third set of memory specifications (e.g., from a database such as policy database 128, a server, or the like). The policy may include a set of rules that assign a data privacy level based on fields of a memory specification. For example, a rule may determine a data privacy level based on a content field (e.g., the field identifying the content that is stored or will be stored in the memory-based device represented by the memory specification) as previously described in Table 1. Rules may be used determine a data privacy based on multiple fields. For example, a rule may determine a data privacy level based on the content field and the removable field may (e.g., the ability to remove memory-based components may cause a higher data privacy due to the ease in which the memory-based component can be transferred or stolen. In some instances, the data privacy level may include one or more categories (e.g., public/secret/top secret, low/ medium/high, etc.). In other instances the data privacy level may be represented as a percentage, an integer, a real number, or any other mechanism that indicates a relative sensitivity of data and/or risk of the data being leaked or stolen.

At block 324, the computing device transmits the memory-asset data structure to a memory-based component connected to the computing device. In some instance, the computing device may transmit the memory-asset data structure to local storage (e.g., a memory-based component of the computing device). In other instances, the memory-asset data structure may be transmitted to remote storage (e.g., a memory-based component such as external storage, a database, etc. that is connected to the computing device via a wired or wireless communication protocol). In still yet other instances, the memory-asset data structure may be transmitted to a memory-based component of another device (e.g., a server, another computing device, a client device, etc. connected to the computing device via a wired or wireless communication protocol).

In some examples, the computing device may receive an indication of an operational change in a device (e.g., such as the new device). The computing device may retrieve the memory-asset data structure and determine one or more operations to perform based on the operational change and a data privacy level assigned to one or more memory specifications associated with the device. For example, the operational change may correspond to an end-of-life of the device or a memory-based component therein. The computing device may then determine that a memory specification associated with the device are assigned a top secret data privacy level. The computing device may then execute operations that cause the memory-based components represented by memory specifications having a top secret data privacy level to be destroyed and/or the device itself to be destroyed. This may prevent memory-based components with sensitive user data from being recycled into new devices where the sensitive user data may be leak to the new users of the device. In some instances, memory-based components represented by memory specifications assigned top secret data privacy levels may be destroyed to prevent accidental leaking of user data, data usable to access user data (e.g., user keys, credentials, logs, etc.), or data usable to compromise system security (e.g., firmware, error logs, etc.), combinations thereof, or the like. The one or more operations may determine how the device may be removed from system managed by the computing device (e.g., erased, recycled, repurposed, remanufacture red, destroyed, etc.).

Figure 4:
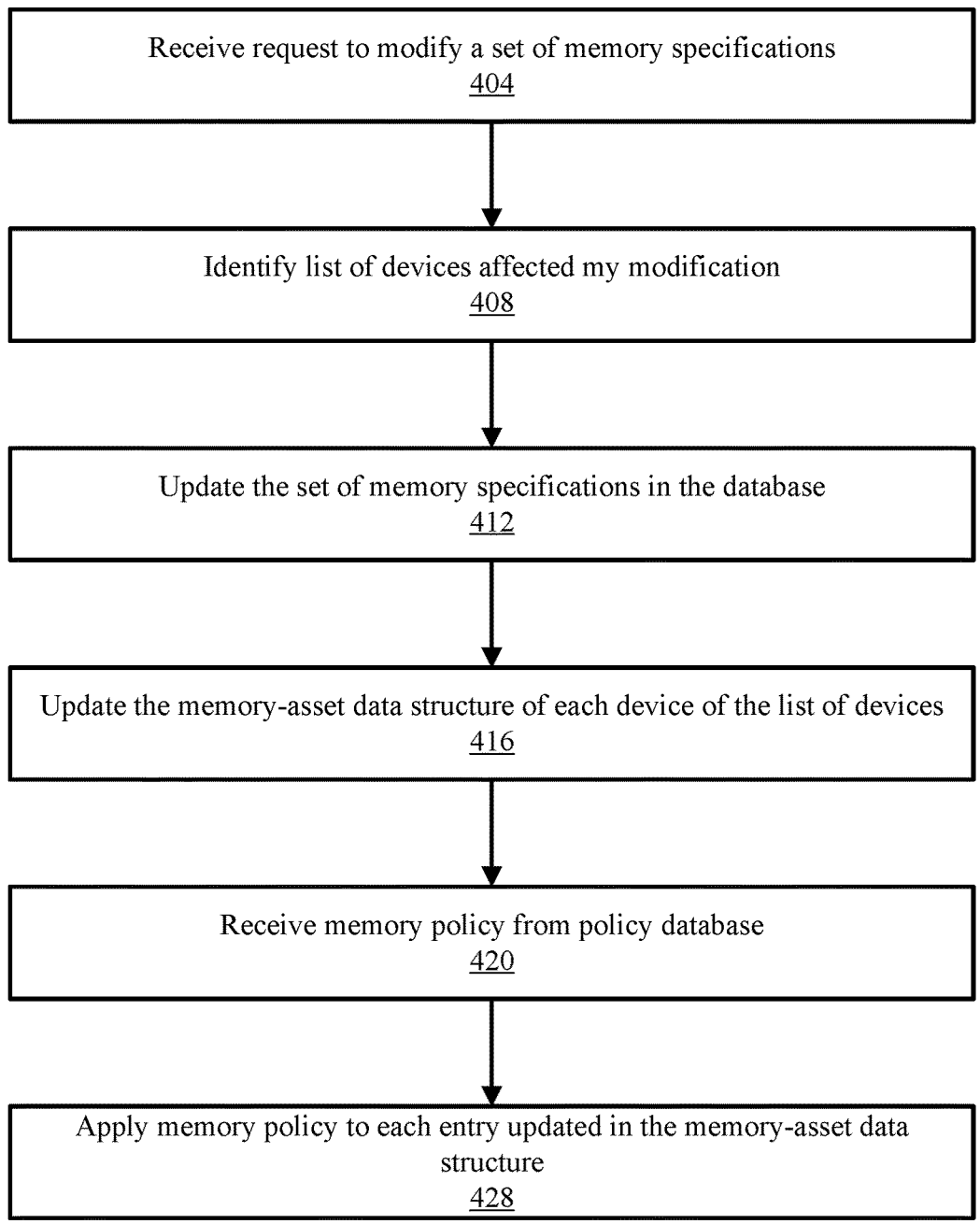
FIG. 4 depicts an example flowchart of a process for modifying memory specifications by an asset management system according to certain aspects of the present disclosure.

FIG. 4 depicts an example flowchart of a process for modifying memory specifications by an asset management system according to certain aspects of the present disclosure. At block 404, a computing device (e.g., computing device 104) may receive input indicating a change to a set of memory specifications. The input may include an identification of the set of memory specifications (e.g., referred to as a statement of volatility or SoV) and indication as to the change to the set of memory specifications. The change may include one or more new memory specifications, one or more memory specifications to be deleted, and/or one or more memory specifications to me modified (e.g., a change in one or more fields of a memory specification). The set of memory specifications may correspond to memory-based components of devices (e.g., such as devices 120) some of which being connected to a system (e.g., such as system 100) managed by the computing device. The change to the set of memory specifications may be received form a client device, a manufacturer of the device, a previous owner of the device, an operator of the device, etc.

At block 408, the computing device may identify of a list of devices that may be affected by the change to the set of memory specifications. For example, the computing device includes a memory-asset data structure that tracks memory-based components of devices of the system. Each memory-based component may be represented by memory specification. Changes to the memory specifications may change how the computing device manages devices or memory-based components therein of the system. For example, a change to memory specification may indicate that a memory-based components now stores user credential, which may cause the computing device to manage the operations affecting the memory-based component to prevent unauthorized distribution or access to the contents of the memory-based component.

At block 412, the modification to the set of memory specifications may be implemented within a database storing sets of memory specifications (e.g., SoV database 124). For example, the modified memory specifications may be stored in the database (e.g., replacing the unmodified versions of the memory specifications). Alternatively, the computing device may define, for each modified memory specification, the delta (e.g., the difference between the unmodified memory specification and the modified memory specification) may be used to update the unmodified memory specifications to the modified memory specification. The process of merging memory specifications may be performed as previously described in FIG. 2.

At block 416, the computing device may update the memory-asset data structure based on the changes to the set of memory specifications. The memory-asset data structure may include memory specifications that represent each memory-based component of devices in the system (e.g., a subset of the memory specifications stored in the database). The updates to the set of memory specifications may be applied the memory specifications of the memory-asset data structure.

At block 420, the computing device may receive a policy from a policy database (e.g. such as policy database 128). The computing device may receive the policy in response to a request by the computing device for the policy. In some instances, the computing device may request a policy based on the updated memory specifications. In other instances, the computing device may request general policy (e.g., applicable to the memory specifications of the memory-asset data structure.

At block 428, the computing device may apply the policy to the updated memory specifications in the memory-asset data structure. The policy may be used to determine a data privacy level for each updated memory specification included in the memory-asset data structure. The policy may be applied as previously described.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
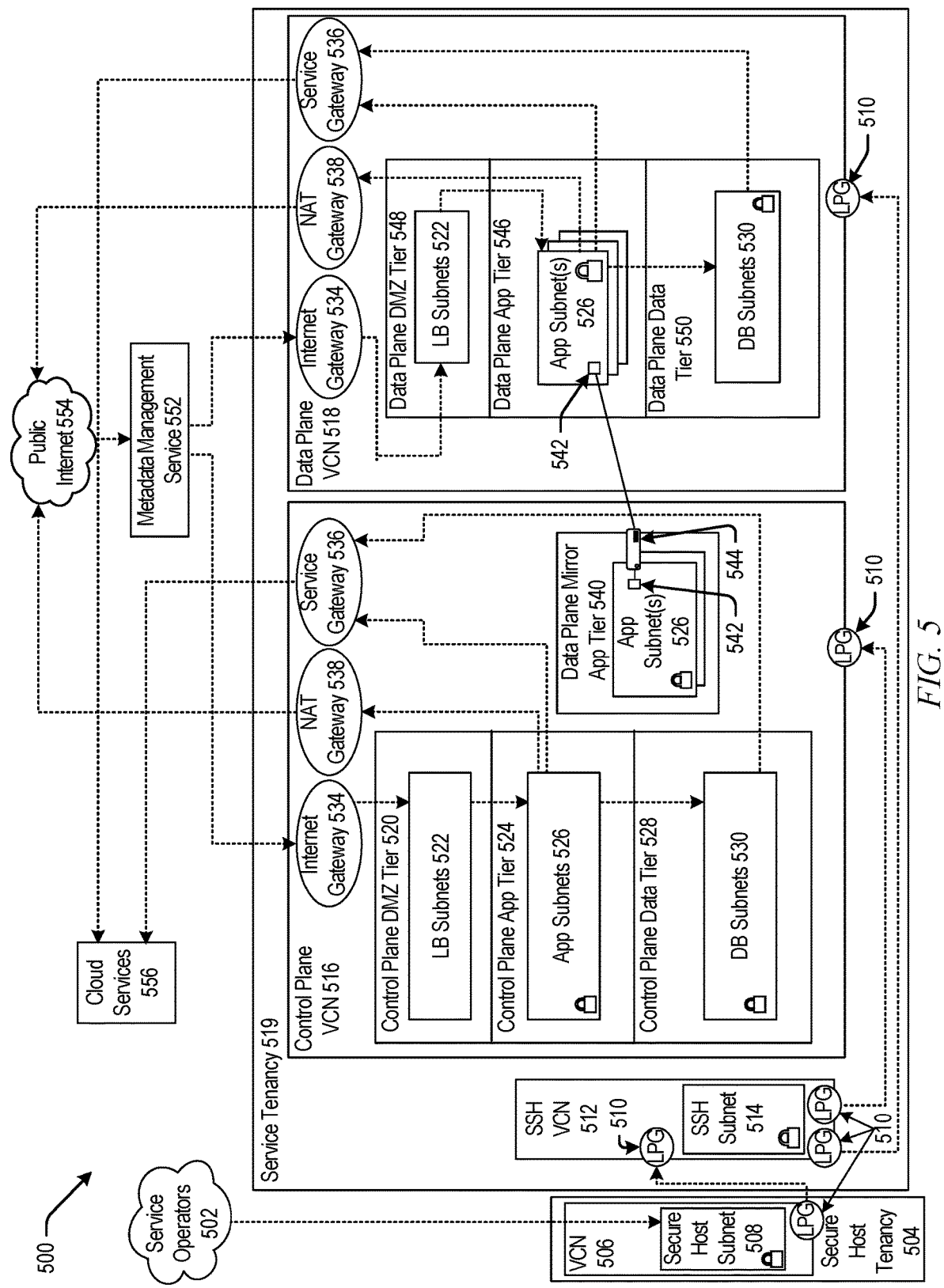
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep security breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of security, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
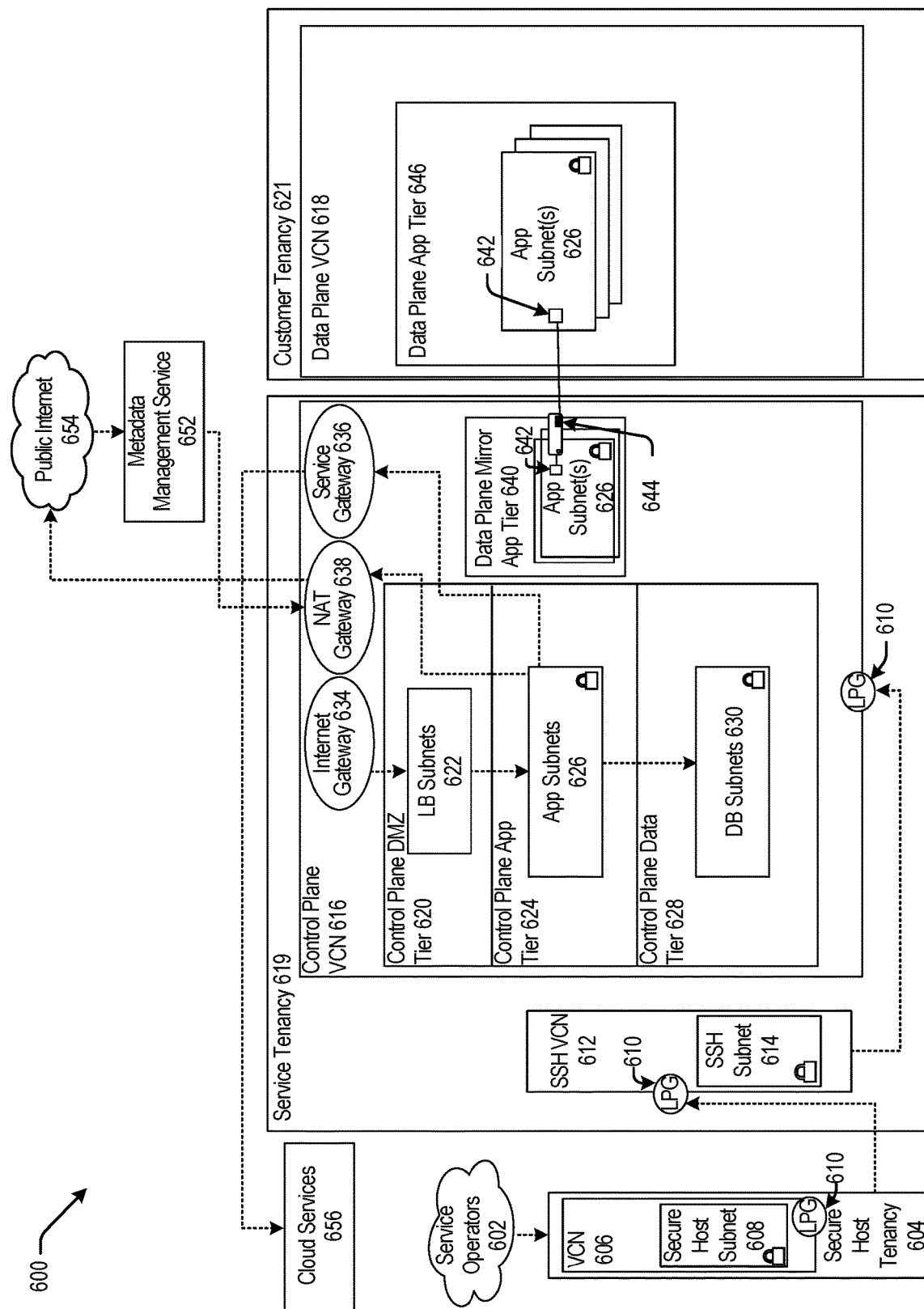
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 502 of FIG. 5) can be communicatively coupled to a secure host tenancy 604 (e.g. the secure host tenancy 504 of FIG. 5) that can include a virtual cloud network (VCN) 606 (e.g. the VCN 506 of FIG. 5) and a secure host subnet 608 (e.g. the secure host subnet 508 of FIG. 5). The VCN 606 can include a local peering gateway (LPG) 610 (e.g. the LPG 510 of FIG. 5) that can be communicatively coupled to a secure shell (SSH) VCN 612 (e.g. the SSH VCN 512 of FIG. 5) via an LPG 510 contained in the SSH VCN 612. The SSH VCN 612 can include an SSH subnet 614 (e.g. the SSH subnet 514 of FIG. 5), and the SSH VCN 612 can be communicatively coupled to a control plane VCN 616 (e.g. the control plane VCN 516 of FIG. 5) via an LPG 610 contained in the control plane VCN 616. The control plane VCN 616 can be contained in a service tenancy 619 (e.g. the service tenancy 519 of FIG. 5), and the data plane VCN 618 (e.g. the data plane VCN 518 of FIG. 5) can be contained in a customer tenancy 621 that may be owned or operated by users, or customers, of the system.

The control plane VCN 616 can include a control plane DMZ tier 620 (e.g. the control plane DMZ tier 520 of FIG. 5) that can include LB subnet(s) 622 (e.g. LB subnet(s) 522 of FIG. 5), a control plane app tier 624 (e.g. the control plane app tier 524 of FIG. 5) that can include app subnet(s) 626 (e.g. app subnet(s) 526 of FIG. 5), a control plane data tier 628 (e.g. the control plane data tier 528 of FIG. 5) that can include database (DB) subnet(s) 630 (e.g. similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g. the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g. the service gateway of FIG. 5) and a network address translation (NAT) gateway 638 (e.g. the NAT gateway 538 of FIG. 5). The control plane VCN 616 can include the service gateway 636 and the NAT gateway 638.

The control plane VCN 616 can include a data plane mirror app tier 640 (e.g. the data plane mirror app tier 540 of FIG. 5) that can include app subnet(s) 626. The app subnet(s) 626 contained in the data plane mirror app tier 640 can include a virtual network interface controller (VNIC) 642 (e.g. the VNIC of 542) that can execute a compute instance 644 (e.g. similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g. the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g. the metadata management service 552 of FIG. 5) that can be communicatively coupled to public Internet 654 (e.g. public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g. cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
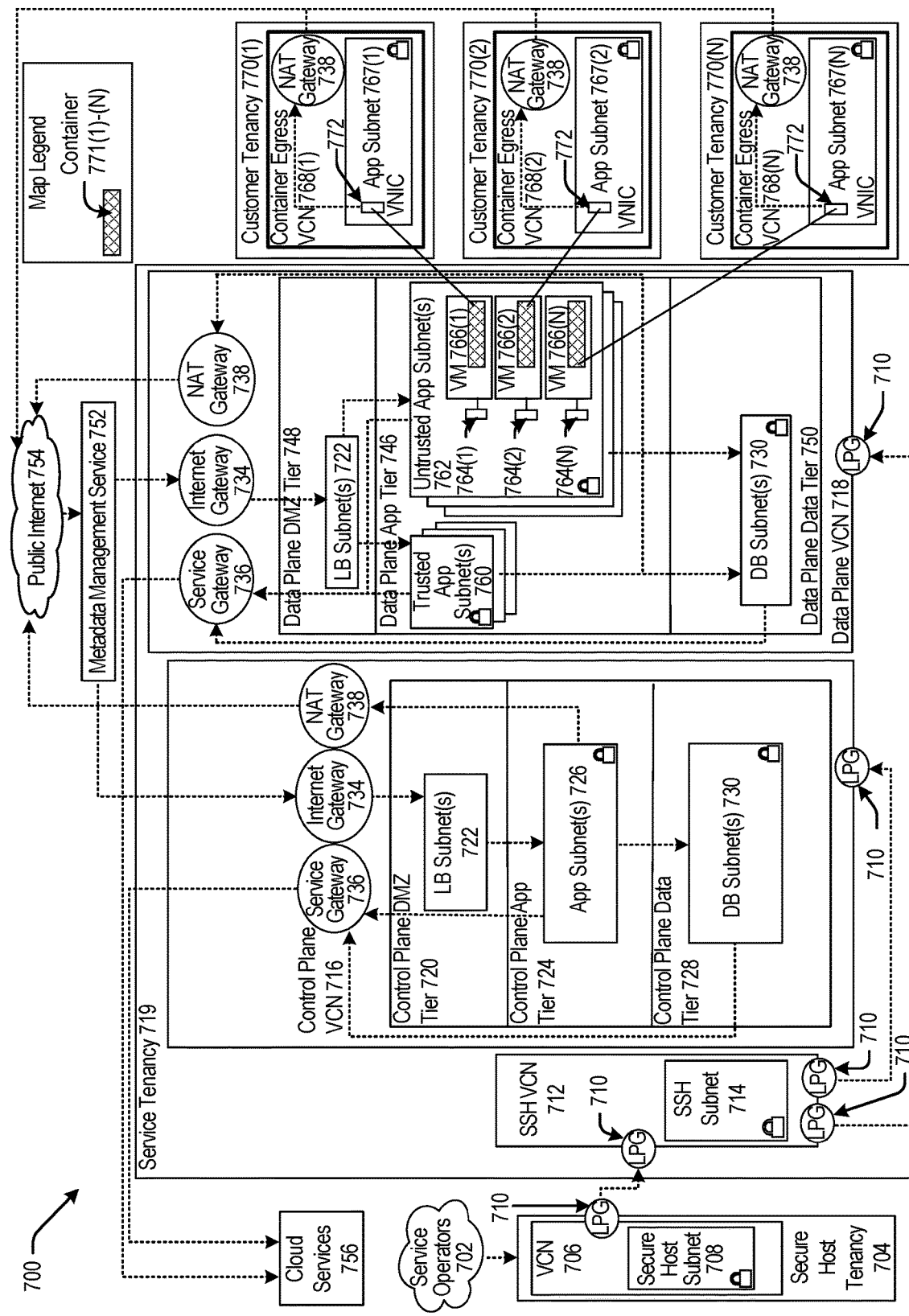
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 502 of FIG. 5) can be communicatively coupled to a secure host tenancy 704 (e.g. the secure host tenancy 504 of FIG. 5) that can include a virtual cloud network (VCN) 706 (e.g. the VCN 506 of FIG. 5) and a secure host subnet 708 (e.g. the secure host subnet 508 of FIG. 5). The VCN 706 can include an LPG 710 (e.g. the LPG 510 of FIG. 5) that can be communicatively coupled to an SSH VCN 712 (e.g. the SSH VCN 512 of FIG. 5) via an LPG 710 contained in the SSH VCN 712. The SSH VCN 712 can include an SSH subnet 714 (e.g. the SSH subnet 514 of FIG. 5), and the SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane 518 of FIG. 5) via an LPG 710 contained in the data plane VCN 718. The control plane VCN 716 and the data plane VCN 718 can be contained in a service tenancy 719 (e.g. the service tenancy 519 of FIG. 5).

The control plane VCN 716 can include a control plane DMZ tier 720 (e.g. the control plane DMZ tier 520 of FIG. 5) that can include load balancer (LB) subnet(s) 722 (e.g. LB subnet(s) 522 of FIG. 5), a control plane app tier 724 (e.g. the control plane app tier 524 of FIG. 5) that can include app subnet(s) 726 (e.g. similar to app subnet(s) 526 of FIG. 5), a control plane data tier 728 (e.g. the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g. the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 5) and a network address translation (NAT) gateway 738 (e.g. the NAT gateway 538 of FIG. 5). The control plane VCN 716 can include the service gateway 736 and the NAT gateway 738.

The data plane VCN 718 can include a data plane app tier 746 (e.g. the data plane app tier 546 of FIG. 5), a data plane DMZ tier 748 (e.g. the data plane DMZ tier 548 of FIG. 5), and a data plane data tier 750 (e.g. the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5).

The Internet gateway 734 contained in the control plane VCN 716 and contained in the data plane VCN 718 can be communicatively coupled to a metadata management service 752 (e.g. the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
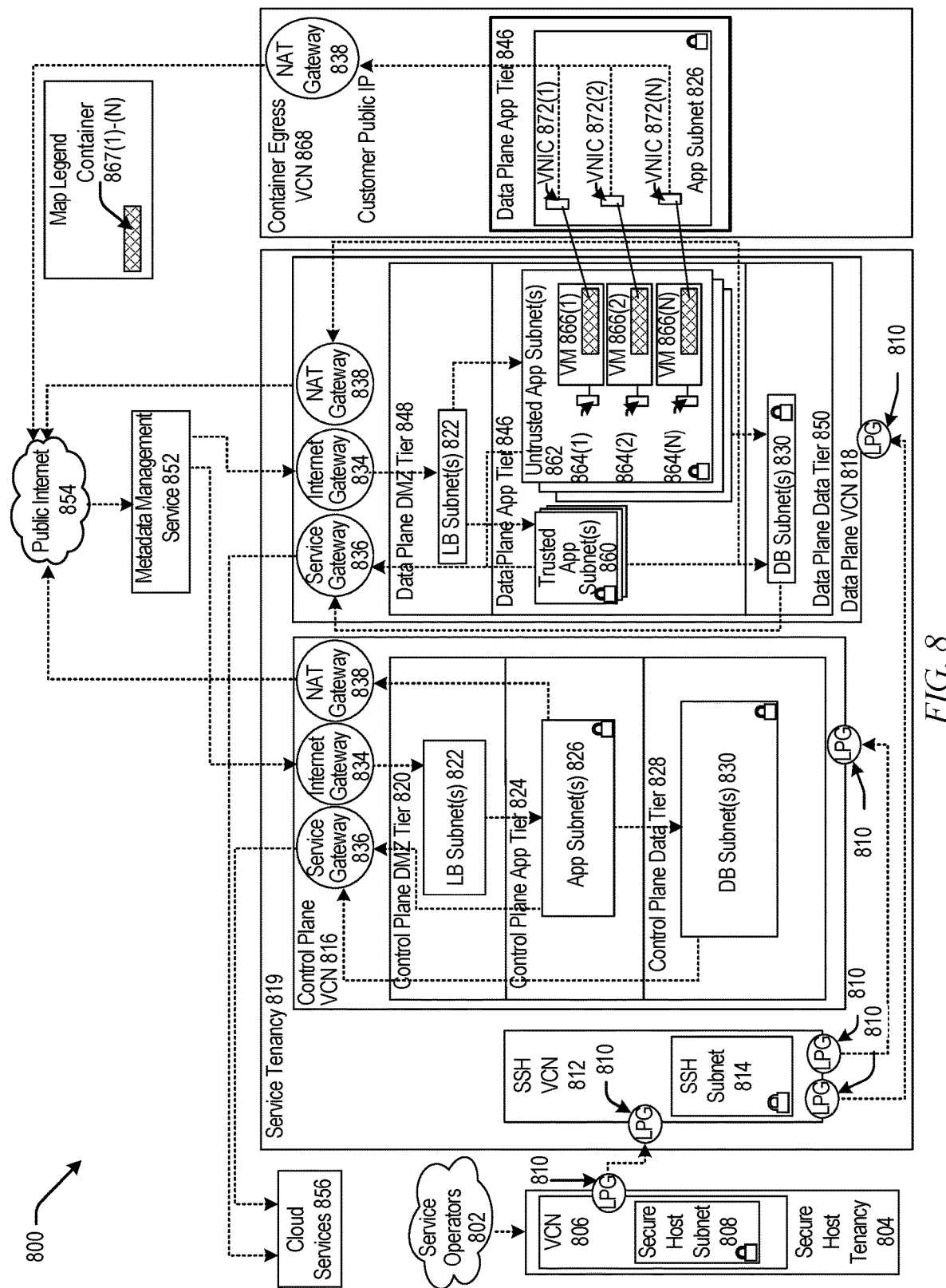
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 502 of FIG. 5) can be communicatively coupled to a secure host tenancy 804 (e.g. the secure host tenancy 504 of FIG. 5) that can include a virtual cloud network (VCN) 806 (e.g. the VCN 506 of FIG. 5) and a secure host subnet 808 (e.g. the secure host subnet 508 of FIG. 5). The VCN 806 can include an LPG 810 (e.g. the LPG 510 of FIG. 5) that can be communicatively coupled to an SSH VCN 812 (e.g. the SSH VCN 512 of FIG. 5) via an LPG 810 contained in the SSH VCN 812. The SSH VCN 812 can include an SSH subnet 814 (e.g. the SSH subnet 514 of FIG. 5), and the SSH VCN 812 can be communicatively coupled to a control plane VCN 816 (e.g. the control plane VCN 516 of FIG. 5) via an LPG 810 contained in the control plane VCN 816 and to a data plane VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5).

The control plane VCN 816 can include a control plane DMZ tier 820 (e.g. the control plane DMZ tier 520 of FIG. 5) that can include LB subnet(s) 822 (e.g. LB subnet(s) 522 of FIG. 5), a control plane app tier 824 (e.g. the control plane app tier 524 of FIG. 5) that can include app subnet(s) 826 (e.g. app subnet(s) 526 of FIG. 5), a control plane data tier 828 (e.g. the control plane data tier 528 of FIG. 5) that can include DB subnet(s) 830 (e.g. DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g. the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 5) and a network address translation (NAT) gateway 838 (e.g. the NAT gateway 538 of FIG. 5). The control plane VCN 816 can include the service gateway 836 and the NAT gateway 838.

The data plane VCN 818 can include a data plane app tier 846 (e.g. the data plane app tier 546 of FIG. 5), a data plane DMZ tier 848 (e.g. the data plane DMZ tier 548 of FIG. 5), and a data plane data tier 850 (e.g. the data plane data tier 550 of FIG. 5). The data plane DMZ tier 848 can include LB subnet(s) 822 that can be communicatively coupled to trusted app subnet(s) 860 (e.g. trusted app subnet(s) 760 of FIG. 7) and untrusted app subnet(s) 862 (e.g. untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g. public Internet 554 of FIG. 5).

The Internet gateway 834 contained in the control plane VCN 816 and contained in the data plane VCN 818 can be communicatively coupled to a metadata management service 852 (e.g. the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
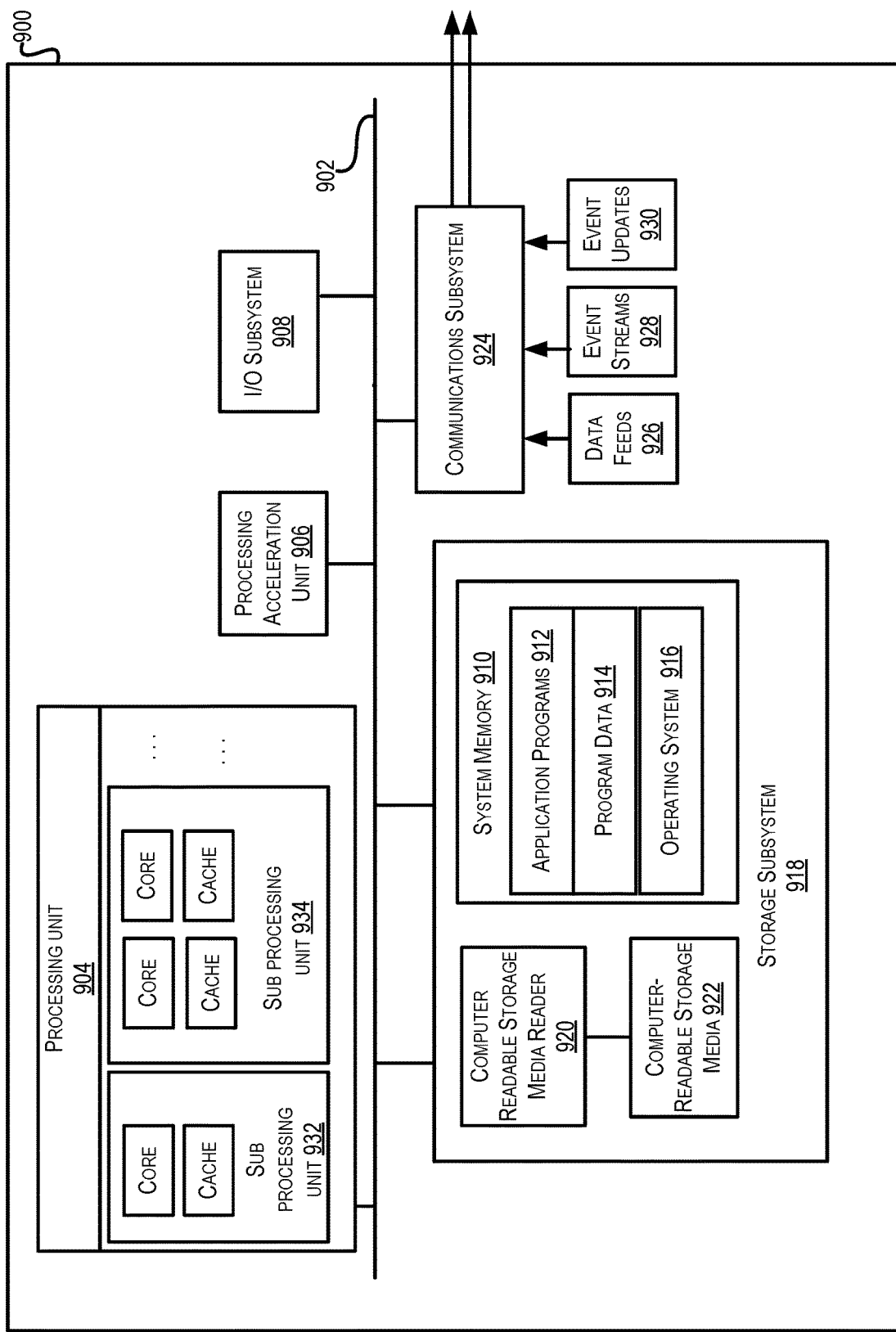
FIG. 9 is a block diagram illustrating an example computer system, according to at least one embodiment.

FIG. 9 illustrates an example computer system 900, in which various embodiments may be implemented such as the client device described in connection with FIGS. 1-4. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing device, an indication that a new device has been connected to a network;
   generating, by the computing device and based at least in part on a comparison between a first set of memory specifications associated with the new device and a second set of memory specifications associated with a remote computing device, a memory-asset data structure configured to store a third set of memory specifications, each memory specification of the third set of memory specifications being included in both the first set of memory specifications and the second set of memory specifications; and
   assigning, by the computing device and to each memory specification of the third set of memory specifications, a data privacy level that is based at least in part on a sensitivity of data stored in a component of the new device,
   wherein assigning the data privacy level comprises:
   assigning, to a particular memory specification of the third set of memory specifications, a highest data privacy level, wherein a highest data privacy level indicates that the component of the new device identified by the particular memory specification stores highly sensitive data.

2. The method of claim 1, further comprising:
   determining that the particular memory specification of the third set of memory specifications is not assigned a data privacy level.

3. The method of claim 1, further comprising:
   defining a fourth set of memory specifications that includes memory specifications from the first set of memory specifications that are not in the second set of memory specifications and memory specifications from the second set of memory specifications that are not in the first set of memory specifications.

4. The method of claim 1, wherein the memory-asset data structure includes, for each memory specification of the third set of memory specifications, an identification of a physical location of the component identified by the memory specification.

5. The method of claim 1, wherein the memory-asset data structure stores memory specifications of a plurality of devices connected to a same network.

6. The method of claim 5, wherein the memory specifications of the plurality of devices are represented in a hierarchy that is based in part on an identification of a data center each device of the plurality of devices operates within.

7. The method of claim 1, further comprising:
receiving an indication of a change in an operation status of the new device;
determining, based at least in part on the memory-asset data structure, that at least one memory specification of the new device is assigned a high data privacy level; and
erasing, in response to determining that at least one memory specification of the new device is assigned a high data privacy level, any data stored on the component of the new device identified by the at least one memory specification.

8. A system comprising:
one or more processors; and
a non-transitory computer-readable storage medium storing instructions that when executed by the one or more processors, cause the one or more processors to perform operations including:
receiving an indication that a new device has been connected to a network;
generating, based at least in part on a comparison between a first set of memory specifications associated with the new device and a second set of memory specifications associated with a remote computing device, a memory-asset data structure configured to store a third set of memory specifications, each memory specification of the third set of memory specifications being included in both the first set of memory specifications and the second set of memory specifications; and
assigning, to each memory specification of the third set of memory specifications, a data privacy level that is based at least in part on a sensitivity of data stored in a component of the new device,
wherein assigning the data privacy level comprises:
assigning, to a particular memory specification of the third set of memory specifications, a highest data privacy level, wherein a highest data privacy level indicates that the component of the new device identified by the particular memory specification stores highly sensitive data.

9. The system of claim 8, further comprising:
determining that the particular memory specification of the third set of memory specifications is not assigned a data privacy level.

10. The system of claim 8, further comprising:
defining a fourth set of memory specifications that includes memory specifications from the first set of memory specifications that are not in the second set of memory specifications and memory specifications from the second set of memory specifications that are not in the first set of memory specifications.

11. The system of claim 8, wherein the memory-asset data structure includes, for each memory specification of the third set of memory specifications, an identification of a physical location of the component identified by the memory specification.

12. The system of claim 8, wherein the memory-asset data structure stores memory specifications of a plurality of devices connected to a same network.

13. The system of claim 12, wherein the memory specifications of the plurality of devices are represented in a hierarchy that is based in part on an identification of a data center each device of the plurality of devices operates within.

14. The system of claim 8, further comprising:
receiving an indication of a change in an operation status of the new device;
determining, based at least in part on the memory-asset data structure, that at least one memory specification of the new device is assigned a high data privacy level; and
erasing, in response to determining that at least one memory specification of the new device is assigned a high data privacy level, any data stored on the component of the new device identified by the at least one memory specification.

15. A non-transitory computer-readable storage medium storing instructions that when executed by one or more processors, cause the one or more processors to perform operations including:
receiving an indication that a new device has been connected to a network;
generating, based at least in part on a comparison between a first set of memory specifications associated with the new device and a second set of memory specifications associated with a remote computing device, a memory-asset data structure configured to store a third set of memory specifications, each memory specification of the third set of memory specifications being included in both the first set of memory specifications and the second set of memory specifications; and
assigning, to each memory specification of the third set of memory specifications, a data privacy level that is based at least in part on a sensitivity of data stored in a component of the new device,
wherein assigning the data privacy level comprises:
assigning, to a particular memory specification of the third set of memory specifications, a highest data privacy level, wherein a highest data privacy level indicates that the component of the new device identified by the particular memory specification stores highly sensitive data.

16. The non-transitory computer-readable storage medium of claim 15, further comprising:
determining that the particular memory specification of the third set of memory specifications is not assigned a data privacy level.

17. The non-transitory computer-readable storage medium of claim 15, further comprising:
defining a fourth set of memory specifications that includes memory specifications from the first set of memory specifications that are not in the second set of memory specifications and memory specifications from the second set of memory specifications that are not in the first set of memory specifications.

18. The non-transitory computer-readable storage medium of claim 15, wherein the memory-asset data structure includes, for each memory specification of the third set of memory specifications, an identification of a physical location of the component identified by the memory specification.

19. The non-transitory computer-readable storage medium of claim 15, wherein the memory-asset data structure stores memory specifications of a plurality of devices connected to a same network.

20. The non-transitory computer-readable storage medium of claim 15, further comprising:
receiving an indication of a change in an operation status of the new device;
determining, based at least in part on the memory-asset data structure, that at least one memory specification of the new device is assigned a high data privacy level; and
erasing, in response to determining that at least one memory specification of the new device is assigned a high data privacy level, any data stored on the component of the new device identified by the at least one memory specification.

* * * * *